United States Patent
Roland

[11] Patent Number: 5,944,089
[45] Date of Patent: Aug. 31, 1999

[54] THERMAL STORAGE SYSTEMS FOR BUILDINGS

[76] Inventor: Russel Anthony Roland, 21624 - 8th Pl. West, Bothell, Wash. 98021

[21] Appl. No.: 08/249,400

[22] Filed: May 26, 1994

[51] Int. Cl.⁶ .................................................. F28D 17/00
[52] U.S. Cl. ............... 165/10; 165/104.17; 165/145; 165/902; 165/905; 62/393; 62/434; 62/59
[58] Field of Search ............... 165/902, 18, 104.17, 165/175, 10, 905, 145; 62/437, 434, 393, 59, 140, 354

[56] References Cited

U.S. PATENT DOCUMENTS

| | | | |
|---|---|---|---|
| 2,000,467 | 5/1935 | Lindseth | 165/18 |
| 2,656,157 | 10/1953 | Wasielewski | 165/145 |
| 2,737,027 | 3/1956 | Kleist | 62/6 |
| 2,933,885 | 4/1960 | Benedek et al. | 60/26 |
| 3,062,510 | 11/1962 | Percival | 257/313 |
| 3,153,446 | 10/1964 | Shaw | 165/175 |
| 3,163,209 | 12/1964 | Shinn | 165/83 |
| 3,653,221 | 4/1972 | Angus | 62/59 |
| 3,960,207 | 6/1976 | Boer | 165/104 R |
| 4,054,980 | 10/1977 | Roma | 29/157.3 R |
| 4,091,863 | 5/1978 | Schroder | 165/1 |
| 4,276,750 | 7/1981 | Kawasumi | 62/354 |
| 4,294,078 | 10/1981 | MacCracken | 62/59 |
| 4,403,645 | 9/1983 | MacCracken | 165/10 |
| 4,565,069 | 1/1986 | MacCracken | 62/66 |
| 4,608,836 | 9/1986 | MacCracken et al. | 62/325 |
| 4,671,347 | 6/1987 | MacCracken | 165/10 |
| 4,757,690 | 7/1988 | Holowczenko et al. | 165/905 |
| 4,827,735 | 5/1989 | Foley | 62/434 |
| 4,909,318 | 3/1990 | Ymse | 165/145 |
| 5,005,368 | 4/1991 | MacCracken et al. | 62/139 |
| 5,056,320 | 10/1991 | Winkler | 62/59 |
| 5,228,504 | 7/1993 | Mantegazza et al. | 165/10 |
| 5,372,011 | 12/1994 | O'Neal | 62/434 |

FOREIGN PATENT DOCUMENTS

| | | |
|---|---|---|
| 123424 | 6/1967 | Czechoslovakia . |
| 0011343 | 2/1978 | Japan . |
| 0036835 | 2/1985 | Japan . |

*Primary Examiner*—Christopher Atkinson
*Attorney, Agent, or Firm*—Vance, Romero & Montague, P.S.

[57] ABSTRACT

Apparatus and processes related to thermal storage and exchange systems for use in buildings to selectively cool and/or heat a heat storage medium and cause said medium to reversibly pass between a liquid phase and a solid phase without requiring a complete discharge of a thermal reservoir between phase changes.

19 Claims, 12 Drawing Sheets

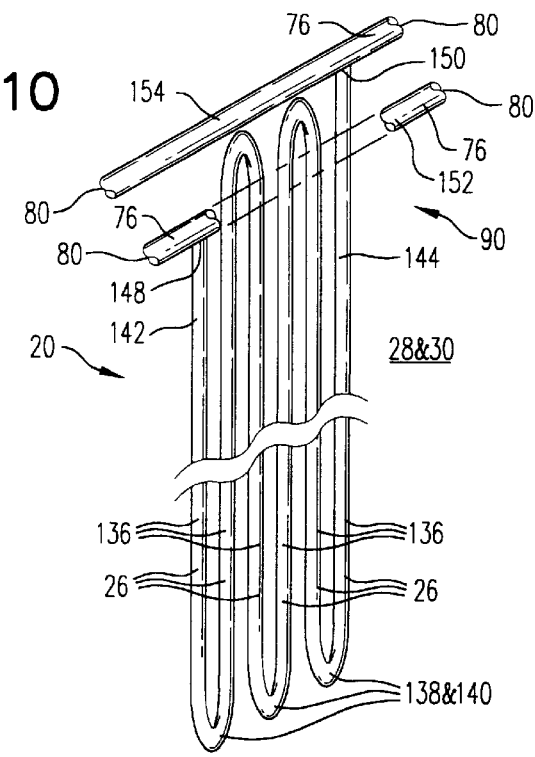
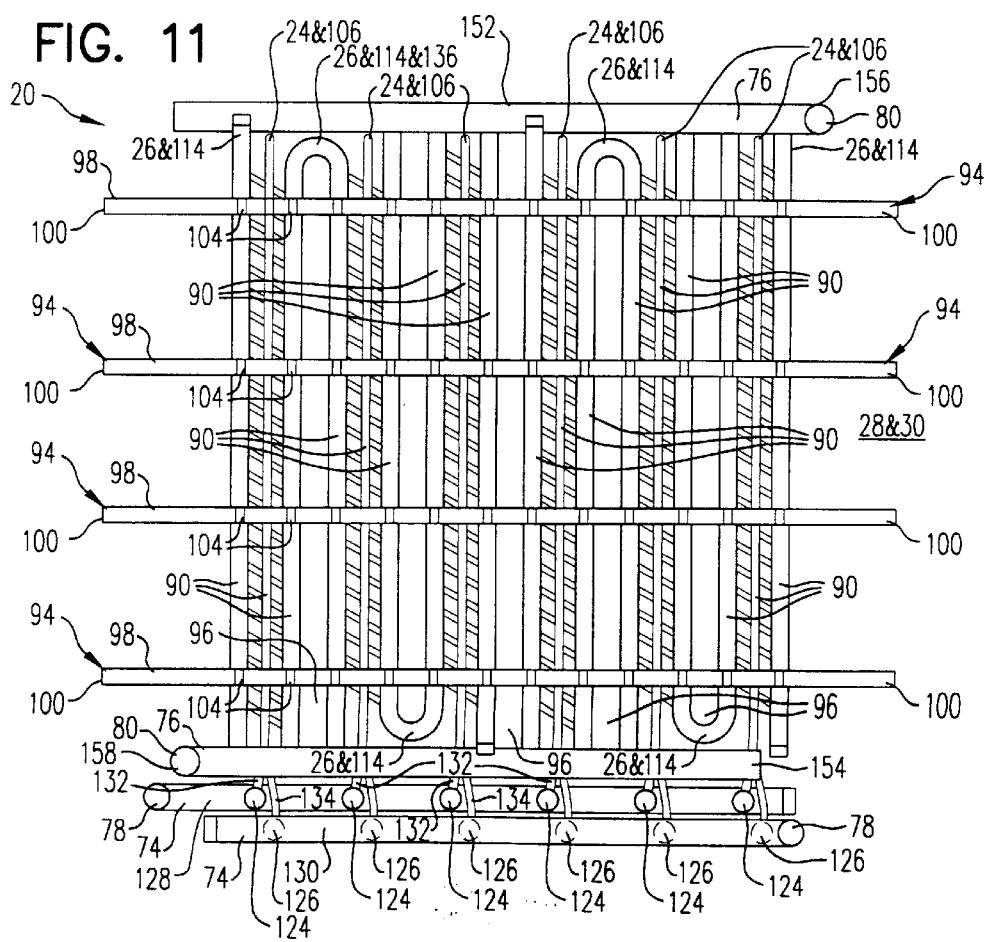

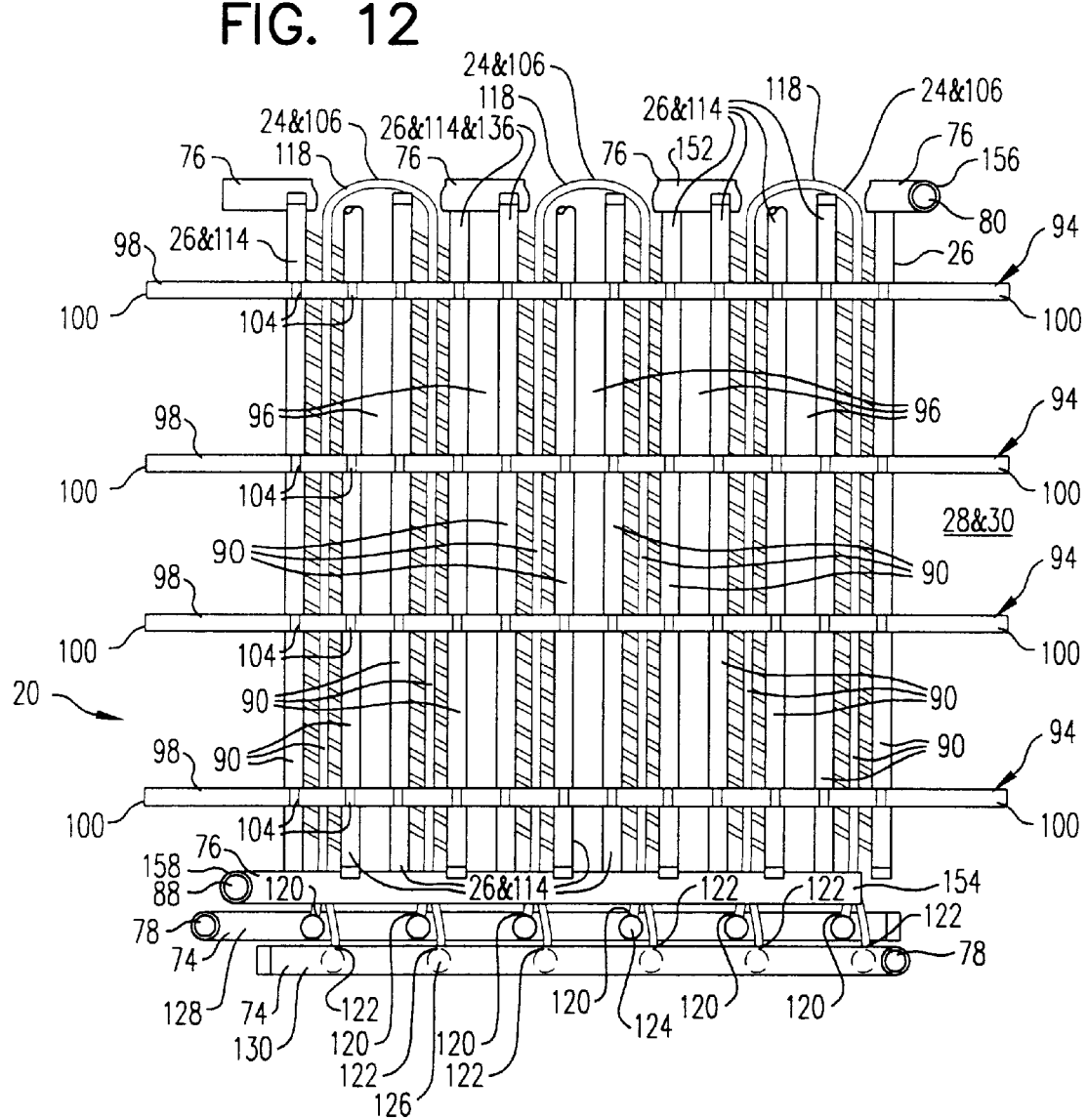

THERMAL STORAGE SYSTEMS FOR BUILDINGS

COPYRIGHT NOTICE

@ Copyright 1994, James R. Vance. All Rights Reserved.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

This invention relates to thermal or heat storage and exchange systems that can be used in buildings. More particularly, this invention relates to apparatus and processes selectively to cool and/or heat a heat storage medium and cause said medium to pass reversibly between a liquid phase and a solid phase without requiring a complete discharge of a thermal reservoir between phase changes.

BACKGROUND OF THE INVENTION

Since the advent of residential and commercial air conditioning systems, many ingenious apparatus and processes for cooling ambient air temperatures within buildings have been created. One general concept is almost universally utilized throughout such systems. That concept is to use a refrigeration process to change a heat storage medium from a liquid state to a frozen solid state, and then use the coolness stored within the frozen medium to cool the ambient air of the building.

For example, many commercial ice storage or thermal storage air-conditioning systems typically include a large storage container that is filled with a heat storage medium such as liquid water, a fluid brine solution, or other phase-change material (PCM). For purposes of easy understanding the term "water" will be used to indicate any appropriate heat storage medium, including, but not limited to, water, a brine solution, or other phase-change material (PCM).

A section of piping is placed within the storage container so that a substantial portion thereof is immersed within the water. The piping is connected to a refrigeration system.

In a standard refrigeration system liquid refrigerant at high pressure is passed through an expansion valve to an area of low pressure called an evaporator. As the liquid refrigerant passes from the expansion valve into the evaporator some of the refrigerant turns from a liquid to a gaseous vapor. As a consequence of the liquid refrigerant turning to a vapor, the refrigerant loses heat and becomes colder.

After the refrigerant passes through the evaporator, the refrigerant enters a compressor and is subjected to a high pressure. The compressor pumps the refrigerant to a condenser. As the refrigerant flows through the condenser, the high pressure causes the vapor to condense back to a liquid. As this process occurs, heat is expended and the condenser becomes warm. This process is known as refrigeration.

During a charging phase of the thermal storage system, the piping, that is immersed within the contained water, functions as an evaporator. Consequently, liquid water that surrounds or contacts the piping is quickly cooled and frozen to form ice. As the charging phase of the system continues, the amount of ice surrounding the piping increases until nearly the entire volume of contained water forms a large block of ice.

During the charging phase of the thermal storage system, the condenser is generally located outside the building so that heat generated during the condensing phase can be expelled into the atmosphere, whereupon the refrigeration process begins again.

During a discharging phase of the thermal storage system, the process of passing liquid or brine solution, and/or the evaporated refrigerant through the system is generally reversed. Consequently, the piping that is located within the storage container and is imbedded within a nearly solid block of ice, no longer functions as an evaporator to cool the water. Rather, such piping functions as a heat pump, condenser, or heat exchanger, to remove stored thermal energy to cool the building. For example, heated or warm liquid refrigerant can be passed through the piping, whereupon the liquid refrigerant and piping are cooled by the surrounding block of ice. As the heated liquid refrigerant and surrounding piping is cooled, the block of ice is slowly melted. Since the block of ice is so large, this cooling effect may continue for a substantial period of time. The cooled liquid or refrigerant can then be used to cool the ambient air temperature of the building.

The following patents describe specific apparatus and processes related to air conditioning systems and heat exchangers: Kleist (U.S. Pat. No. 2,737,027, issued Mar. 6, 1956); Benedek et al. (U.S. Pat. No. 2,933,885, issued Apr. 26, 1960); Percival (U.S. Pat. No. 3,062,510, issued Nov. 6, 1962); Shinn (U.S. Pat. No. 3,163,209, issued Dec. 29, 1964); Angus (U.S. Pat. No. 3,653,221, issued Apr. 4, 1972); Boer (U.S. Pat. No. 3,960,207, issued Jun. 1, 1976); Roma (U.S. Pat. No. 4,054,980, issued Oct. 25, 1977); Schroder (U.S. Pat. No. 4,091,863, issued May 30, 1978); Mac-Cracken (U.S. Pat. No. 4,294,078, issued Oct. 13, 1981); MacCracken (U.S. Pat. No. 4,403,645, issued Sep. 13, 1983); MacCracken (U.S. Pat. No. 4,565,069, issued Jan. 21, 1986); MacCracken et al. (U.S. Pat. No. 4,608,836, issued Sep. 2, 1986); MacCracken (U.S. Pat. No. 4,671,347, issued Jun. 9, 1987); MacCracken et al. (U.S. Pat. No. 5,005,368, issued Apr. 9, 1991); and Pardubice (Czechoslovakia Patent No. 123,424, issued 1967).

The inventor believes that the listed disclosures taken alone or in combination neither anticipate nor render obvious the present invention. Citation of these disclosures does not constitute an admission that such disclosures are relevant or material to the present claims. Rather, such relate only to the general field of this invention and are cited as constituting the closest art of which the inventor is aware.

DISCLOSURE OF INVENTION

One of the primary difficulties and shortcomings of the previously known systems is that many of such systems that contain water cannot be frozen completely to form a solid block of ice. If that occurs, the system would be completely destroyed or inoperative. For example, such systems that are commonly known as "ice builders" and "ice harvesters" cannot be properly operated if the stored water becomes frozen into a solid block of ice.

Other difficulties and shortcomings of many previously known systems is that the process of circulating refrigerant and/or coolant to charge the system must be terminated in order to begin discharging the system.

Furthermore, other difficulties and shortcomings of many previously known systems is that after the water contained within the storage container is converted to a block of solid ice, the system had to be completely discharged before the charging process could again begin. In other words, the block of ice had to be completely melted before the freezing process could be restarted. If the water within the container was only partially thawed and the freezing process was re-initiated, pockets of liquid water could become surrounded by ice. As the liquid water became frozen, the volume of water would expand exerting tremendous forces upon the system. Eventually, the captured water would crack and burst the surrounding envelope or jacket of ice. If there were a substantial number of liquid water pockets or a substantial volume of liquid water encapsulated within the ice, the apparatus that freezes and thaws the water would also become damaged and possibly crack or burst as a result of this phenomenon. If this phenomenon is not avoided, entire heat storage systems can be virtually destroyed.

In other words, without the present invention, refreezing a partially discharged system would be disastrous. The extraordinary pressures imparted by the freezing ice would normally burst the tubing and/or the containment system of the previously known systems. Consequently, engineers of other refrigerant systems try to prevent stratification in their design. The present invention, however, benefits from stratification which generates thermal siphoning and scrubbing of the ice with convention currents without the use of mechanical agitation. In essence, stratification within the present invention is desired and capitalized upon.

There are substantial disadvantages associated with damaging the heat storage system. For example, the financial expenses to repair or replace a damaged heat storage system can be exorbitant. In addition, a substantial amount of labor and time is usually required to repair or replace a damaged heat storage system. Please keep in mind that such damage usually occurs during times of high demand for coolness. Consequently, the impatience to recharge the system may overcome the operator's best judgment to follow standard recharging procedures. If the system becomes damaged and is off-line, such damage usually occurs on the hottest days of the year, when the system is needed the most.

Another disadvantage with the aforementioned heat storage systems is that only a few standard sizes are available in the marketplace. Frequently, additional storage tanks and associated equipment had to be purchased and installed in an effort to accommodate a particular application or meet an altered need. Consequently, the resulting system was either over-sized or under-sized for the particular application.

In addition, once a particular heat storage system is designed and installed within a building, and then the cooling needs of the building change, it is very difficult to modify the existing system. It is the inventor's experience that when additional cooling of a building is required, another large, additional heat storage system is added to the existing system. However, since only a few standard sizes of heat storage systems are available, the added system usually overcompensates for the inadequacy of the existing system. Consequently, a larger than needed additional system is used. In effect, the building owner is required to purchase, install, and operate a system that may far exceed the actual temperature demands of the building. Not only is the initial expenditure more than is required, but during the entire operational lifetime of the system the owner must pay more money to keep the system operating than if an appropriately sized and configured system had been installed.

Another very important disadvantage of the aforementioned heat storage systems, is that as a greater volume of ice is melted, the system becomes less effective in its operation. Consequently, if the system must be completely discharged before the recharging process can begin, a greater amount of time is spent with the system operating in an ineffective and inefficient manner.

Furthermore, at times it is important to discharge the system as quickly as possible such as during variations of peak load. With the systems heretofore known, the maximum discharge rate may be exceeded. Consequently, the system cannot utilize the stored coolant fast enough to meet the demand.

In contrast, the present invention has very little limitations as to its discharge rate. For example, a system using old technology may require six (6) to eight (8) hours to completely discharge. With the present invention, however, the system or thermal reservoir may be completely discharged within approximately one (1) hour. This is a significant improvement of technology over what was previously known.

Within an ideal heat storage system, it would be preferable to operate the system so that coolness may be drawn therefrom during periods of high demand and at the instant the demand decreases, the system could be recharged.

The present invention is that long awaited ideal heat storage system.

The present invention is relatively inexpensive and economical to manufacture. The invention is relatively simple to construct and assemble. The invention is also extremely simple to use and is relatively inexpensive to operate. Furthermore, the invention is efficient, effective, functional, reliable, reusable, compact, rugged, and durable.

The present invention increases the speed and simplifies the procedure to charge and discharge the thermal reservoir. The invention requires less attention during operation.

It is important to note that this invention permits the near immediate transition between charging and/or discharging of the system, without requiring a complete discharge or charge of the thermal reservoir between phase changes. Consequently, the thermal reservoir may be partially discharged and then recharged without having to completely discharge the system before recharging can occur. Similarly, the thermal reservoir may be partially recharged and then discharged without having to completely recharge the system before discharging can occur. Therefore, the present invention eliminates potential damage to the thermal storage and exchange system that otherwise often occurs for failure to completely discharge the system before the system is recharged. In addition, there is no need to completely recharge the system before the system is discharged. This advantage is important to allow continued use of the system to meet variable load demands without having to previously recharge the entire system.

The present invention has a special benefit in permitting its use with a wide variety of differently sized loads or temperature demands. For example, the present invention may be easily adjusted and/or modified to accommodate nearly any imaginable thermal reservoir need.

The present invention may be secured to the building or may be positioned remotely therefrom. Due to the effectiveness and compactness of the invention, the present invention may also be used in areas of extremely limited access.

Conventional or nonconventional refrigeration equipment, such as traditional compressors, pumps, condensers, tanks, tank liners, and control equipment may also be used with the present invention. Consequently, many existing thermal storage and exchange systems may be modified to achieve the purposes of this invention without requiring exorbitant financial expenditures or significant alteration of the refrigeration equipment.

In addition to the foregoing advantages, and other advantages that will be described further below, the present invention also overcomes all of the previously mentioned disadvantages.

Within the preferred embodiment of the present invention, the apparatus generally comprises two intertwined heat exchangers. The two intertwined heat exchangers are placed within a housing or container. A surrounding fluid is then placed within the container. The surrounding fluid at least partially surrounds and contacts the first heat exchanger and the second heat exchanger.

The first heat exchanger is used to make ice. The second heat exchanger is used to discharge or melt the ice.

Both heat exchanger systems may be operated at the same time and/or at different rates to meet the load or demand placed upon the entire system.

Each intertwined set of first and second heat exchangers defines a panel. The present invention may be expanded or contracted for greater or lesser capacity by simply adding or removing additional interconnected panels from the system. Consequently, a system can be custom designed for particular thermal load.

Since each heat exchanger panel is relatively flat, a plurality of panels can be placed within a rectangularly shaped tank or container. This allows for the construction of a very tight, efficient system.

During operation of the invention, a cooled fluid (i.e., hydronic substance) is circulated through the first conduit to freeze the water immediately surrounding that conduit. As this process continues, ice freezes in an even but increasingly thicker layer about the second heat exchanger. The water freezes in a direction extending from the first conduit outwardly. The freezing process may continue until a portion or the entire volume of water is frozen.

At any desired time interval, heated fluid may be circulated through the second conduit, thereby melting the water immediately surrounding that conduit. As the water melts, a liquid conduit or tunnel immediately surrounding the second conduit is formed. This process may be used to partially or completely melt the frozen block of ice.

The physical contact between the first and second conduit or first and second heat exchangers actually increase the efficiency of the system. More particularly, by having the cooled first heat exchanger physically contacting the second heat exchanger, the effective thermal surface area is increased.

To achieve these general and specific objectives the present invention generally comprises: (a) a housing, (b) a first heat exchanger, and (c) a second heat exchanger. Each of these elements and their interaction with one another are discussed and elaborated upon in great detail within the Best Mode For Carrying Out The Invention portion of this disclosure. By this reference, the subject matter discussed therein is expressly included within this portion of the disclosure.

The present invention achieves each of the above-stated objectives and overcomes the foregoing disadvantages and problems. These and other objectives and advantages of the present invention will become more readily apparent upon reading the following disclosure and referring to the attached drawings.

BRIEF DESCRIPTION OF DRAWINGS

FIG. 9 illustrates an alternative embodiment of the invention, wherein different interwoven patterns and locations of attachment are used.

FIG. 10 is a partial, isometric view of an alternative embodiment for the second heat exchanger of the invention.

FIG. 11 is a partial, plan view of an alternative embodiment of the invention, wherein the second heat exchanger has a generally serpentine configuration along a generally horizontal plane so that at least two adjacent piping matrixes are interconnected to form a continuous flow path.

FIG. 12 is a partial, plan view of a further alternative embodiment of the invention, wherein the first heat exchanger has a generally serpentine configuration along a generally horizontal plane so that at least two adjacent piping matrixes are interconnected to form a continuous flow path.

Figure 1:
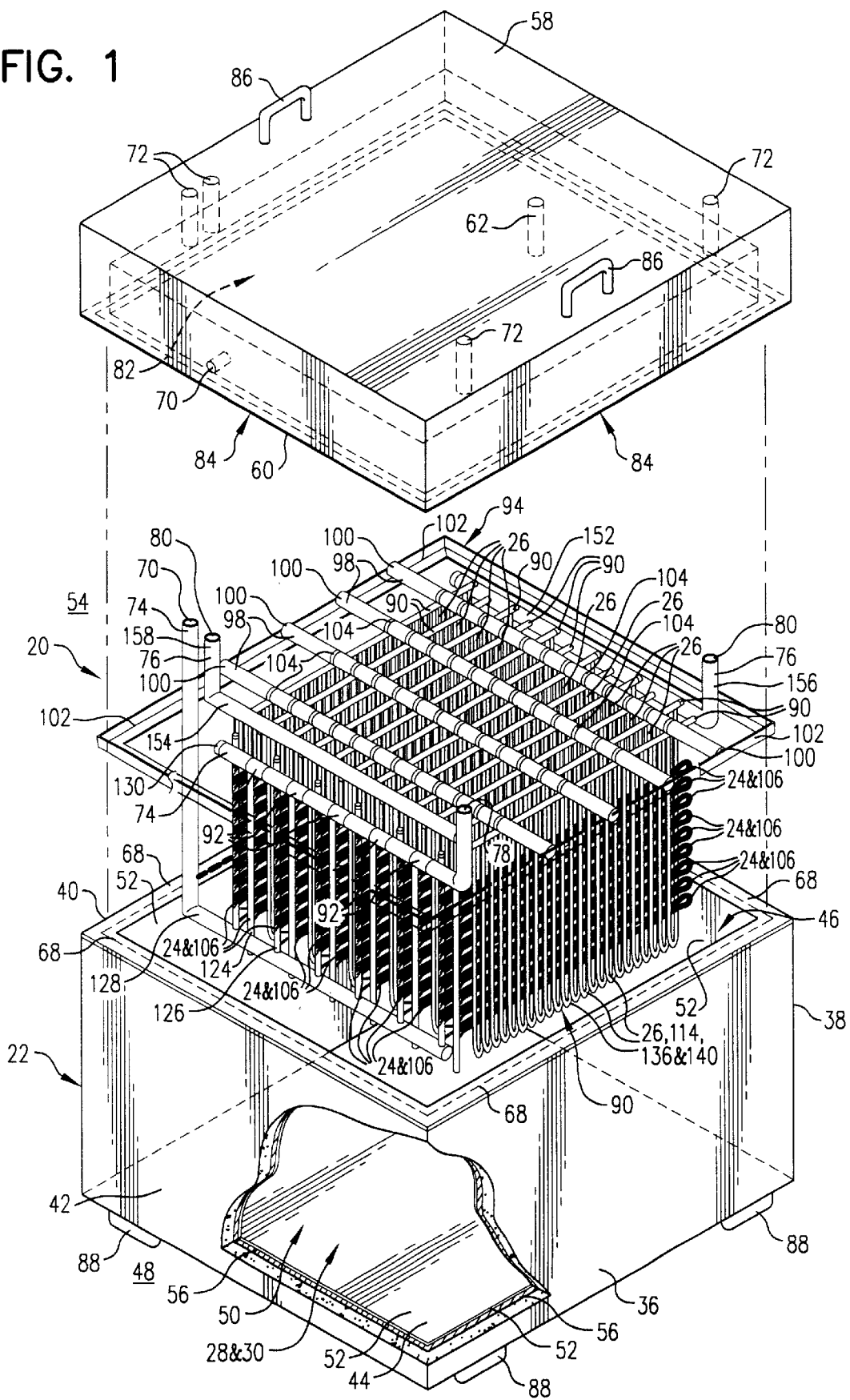
FIG. 1 is a partial, cross-sectional, exploded, isometric view of a first embodiment of the present invention.

One should understand that the drawings are not necessarily to scale and the elements are sometimes illustrated by graphic symbols, phantom lines, diagrammatic representations, and fragmentary views. In certain instances, the inventor may have omitted details which are not necessary for an understanding of the present invention or which render other details difficult to perceive.

BEST MODE FOR CARRYING OUT THE INVENTION

Referring to the drawings, wherein like numerals indicate like parts, to achieve the aforementioned general and specific objectives the present invention generally comprises an apparatus 20 having: (a) a housing 22, (b) a first heat exchanger 24, and (c) a second heat exchanger 26. To better understand the function and interrelationship of these components, however, we will first discuss the environment into which such components will be placed.

The present invention generally includes various embodiments of a thermal storage and exchange system that can be used to cool temperatures within residential and/or commercial buildings. Of course, this invention could be built on a smaller scale to accommodate thermal needs of a lesser magnitude or smaller demand than that which is typically associated with a building.

More particularly, the present invention may be used selectively to cool and/or draw coolness from a thermal reservoir 28. The thermal reservoir 28 may comprise a large volume of heat storage medium 30 that is stored within the housing 22.

Figure 6:
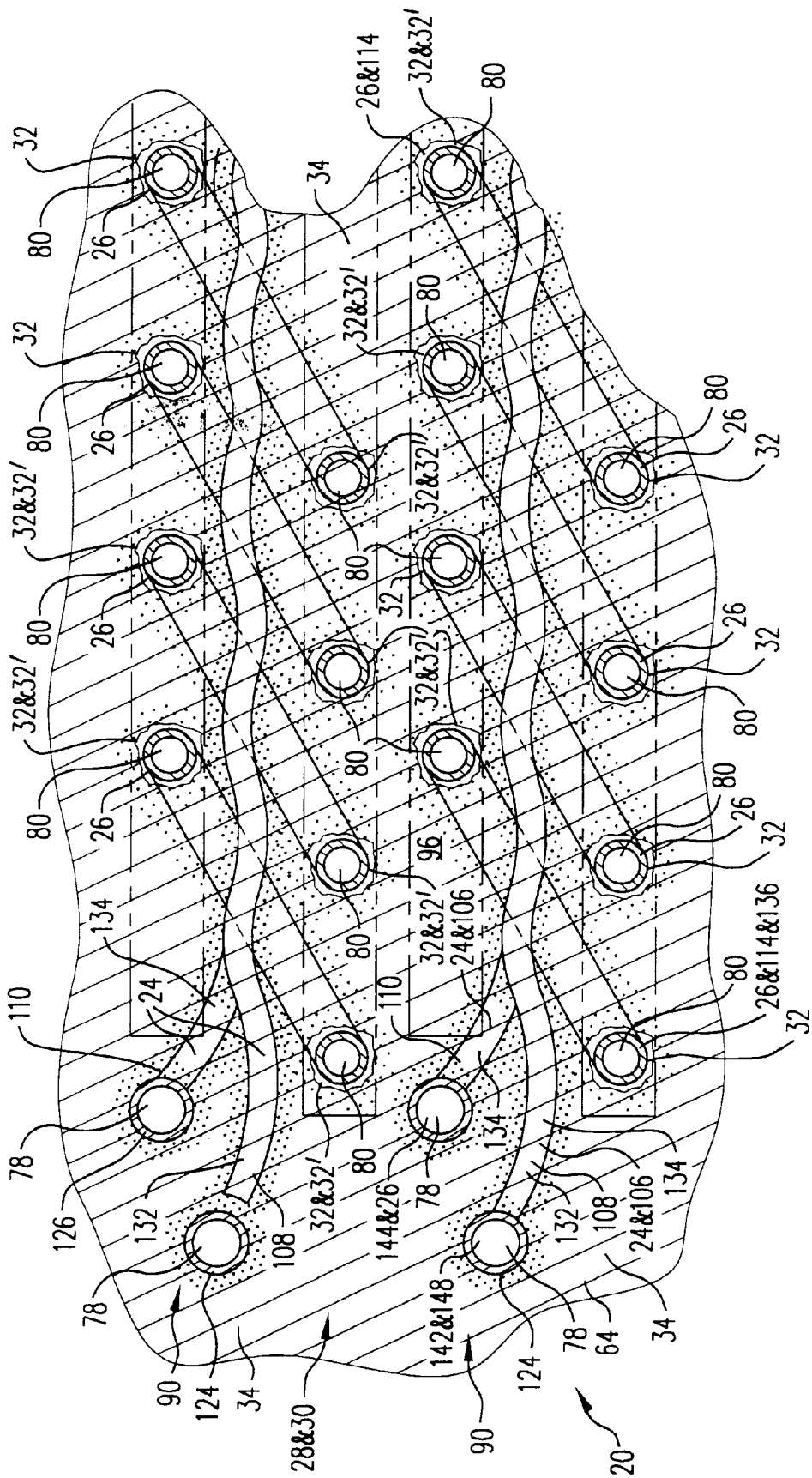
FIG. 6 is a schematic, partial, cross-sectional, plan view of a portion of the first heat exchanger interwoven with a portion of the second heat exchanger, wherein the invention is near completion of a charging cycle so that the heat storage medium generally assumes a frozen solid state.
Figure 7:
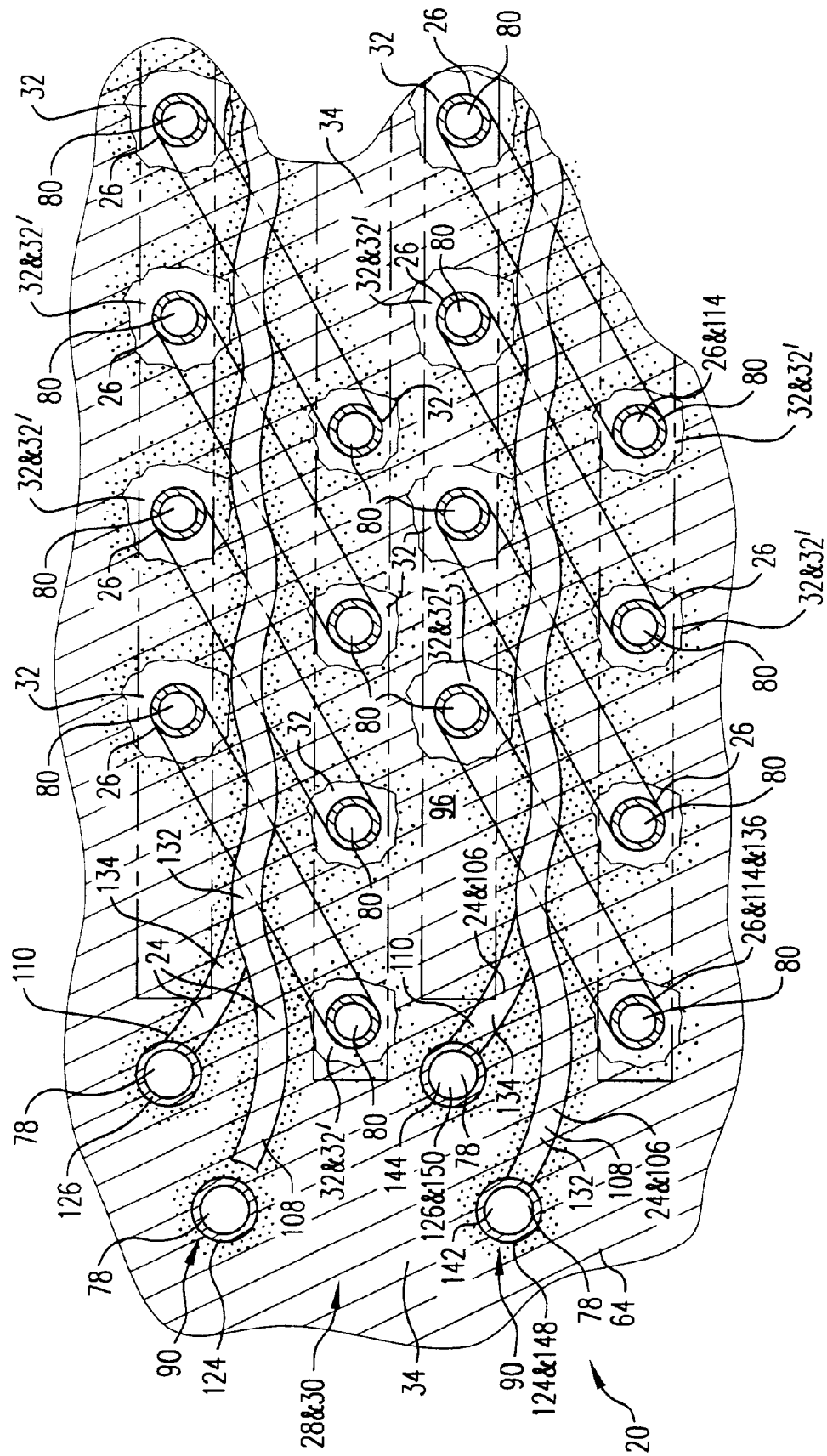
FIG. 7 is a schematic, partial, cross-sectional, plan view of a portion of the first heat exchanger interwoven with a portion of the second heat exchanger as illustrated in FIG. 6, except that the heat storage medium is shown partially melted as occurs during the initial phases of a discharging cycle.

As best seen in FIGS. 6 and 7, the heat storage medium 30 should be capable of reversibly passing between a liquid phase 32 and a solid phase 34. For example, the heat storage medium 30 may comprise any heat absorbing material such as water, brine, glycol solution, or other phase change material (PCM) that can assume a liquid phase 32, fluid state and/or a solid phase 34, frozen state.

The housing 22 may take any desirable size, shape, and configuration. For example, in the preferred embodiment of the invention, the housing 22 is manufactured from poured and cured concrete to form a large container, tank, vessel, tub, tray, or box having a first side 36, a second side 38, a third side 40, a fourth side 42, an integral floor 44 or base, and an opening 46 at the top of the housing 22.

Of course the housing 22 may be manufactured from other materials. For example the housing 22 may be manufactured from metal, wood, plastic, compacted soil, composite materials, and the like.

As with conventional heat storage systems, the housing 22 is either supported by or is secured to a support structure 48. The support structure 48 may comprise the building itself. For example, the housing 22 may be placed upon roof of the building or upon a floor especially dedicated to support mechanical hardware and equipment for the building.

Alternatively, the housing 22 may be supported by or be secured to an independent support structure 48 that is positioned remotely from the building.

Since the present invention is so dramatically effective and efficient during operation, the invention can use a housing 22 that is much smaller in size than what would otherwise be required if a more conventional heat storage system were used. Consequently, the housing 22 of the present invention may be much more compact and may be used in areas of extremely limited access.

The floor 44 and sidewalls 36, 38, 40, and 42 of the housing 22 form and define an interior enclosure 50, compartment, or chamber that is capable of housing and containing the heat storage medium 30 therein.

In essence, the housing 22 defines an ice building storage tank, wherein the heat storage medium 30 or water may be contained, frozen and thawed.

The housing 22 may also be provided with a liner 52. The liner 52 is preferably positioned within the enclosure 50 between the interior sidewalls 36, 38, 40, and 42 of the housing 22 and the heat storage medium 30. It is intended that the liner 52 be capable of at least partially enveloping the heat storage medium 30. For example, the liner 52 may comprise sheets of flexible, impermeable, plastic or rubber that physically insulate the heat storage medium 30 from the interior sidewalls 36, 38, 40, and 42 of the housing 22. The liner 52 may also thermally insulate the heat storage medium 30 from the housing 22 and surrounding atmosphere 54.

If desired, the housing 22 may also be provided with additional thermal insulation 56. For example, the additional thermal insulation 56 may be necessary to adequately insulate the housing 22 if the housing 22 is manufactured from metal or plastic. The thermal insulation 56 may be placed either against the interior and/or exterior sidewalls 36, 38, 40, and 42, and/or the floor 44 of the housing 22.

The large opening 46 positioned at the top of the housing 22 permits the placement of the first heat exchanger 24 and second heat exchanger 26 into the enclosure 50. Furthermore, the large opening 46 permits servicing and maintenance of the apparatus 20.

In the preferred embodiment of the invention, as shown in FIG. 1, the housing 22 is also provided with a removable or hinged lid 58, hood, or roof. The lid 58 enables the large opening 46 to be closed. When the lid 58 is properly positioned atop the housing 22, the interior or lower surface 60 of the lid 58 defines a ceiling for the enclosure 50. The lid 58 may be provided with thermal insulation 56.

The lid 58 may also have an air vent 62, ventilating stack, exhaust stack, hole, or chimney, located therein, which enables the removal of excess atmospheric pressure held within the enclosure 50.

It is the intention of the inventor that only an appropriate amount of heat storage medium 30 be placed within the enclosure 50. For example, the heat storage medium 30 is poured into the enclosure 50 only after the first heat exchanger 24 and the second heat exchanger 26 have already been placed in position within the enclosure 50. A sufficient amount or volume of heat storage medium 30 is poured into the enclosure 50 until a substantial portion of the first heat exchanger 24 and the second heat exchanger 26 are immersed therein. However, an adequate expansion area above an upper surface 64 of the heat storage medium 30 should be maintained. The expansion area basically defines a freeboard 66 between the upper surface 64 of the heat storage medium 30 and an upper edge or rim 68 of the sidewalls 36, 38, 40, and 42.

If needed or desired, the housing 22 and/or lid 58 may be provided with an overflow conduit 70, tube, side vent, or spillway through which excess liquid heat storage medium 30 may be expelled. Overflow conduit 70 is shown in FIG. 1.

The present invention may also or alternatively be provided with a water-level indicator (not shown) and/or overflow protection switch (not shown) that would be activated if the upper surface 64 of the heat storage medium 30 exceeds a predetermined level.

Holes 72 may be provided within the housing 22 and/or lid 58 to permit the passage of piping 74 and 76 therethrough. Thus, the holes 72 permit the ingress and egress of a refrigerant 78 (or any chilled fluid or gas) and other fluid and/or gas 80, contained within the piping 74 and 76, respectively, to pass into and out of the enclosure 50.

Refrigerant 78 may also be referred to as a first fluid or gas that is capable of being contained and transported within a first conduit 106. Fluid or gas 80 may also be referred to as a second fluid or gas that is capable of being contained and transported within a second conduit 114.

If desired, flashing (not shown) may be placed about the piping 74 and/or 76 at each hole 72 to prevent contaminants from entering into the enclosure 50.

As referenced above, the lid 58 may also be provided with a hinge (not shown) to enable the easy raising and lowering of the lid 58 into place atop the housing 22 sidewalls 36, 38, 40, and 42.

As shown in FIG. 1, a recess 82 and/or seat may be positioned about a periphery or rim 84 of the lid 58 to receive the upper rim 68 of the housing 22 and secure the lid 58 in place. If needed and/or desired, a gasket (not shown) may be placed about the recess 82 or seat of the lid 58.

The lid 58 may also be provided with one or more handles 86 and/or loops that accommodate the raising and lowering of the lid 58.

The housing 22 may also be provided with means for leveling the same. For example, one or more leveling feet 88 may be attached to, or be formed integrally within, the floor 44 and/or sidewalls 36, 38, 40, and 42 of the housing 22.

In addition to the leveling feet 88, or alternatively, the housing 22 may be provided with one or more support legs (not shown). If needed and/or desired, one or more of the support legs may be provided with a rotatable, height-adjustable shaft (not shown) and a crank (not shown) that is operably connected thereto to enable the proper level the housing 22.

The primary function of the first heat exchanger 24 and the second heat exchanger 26 is to selectively and reversibly charge and/or discharge the thermal reservoir 28. More particularly, the primary function of the first heat exchanger 24 is to selectively charge the thermal reservoir 28. The primary function of the second heat exchanger 26 is to selectively discharge the thermal reservoir 28.

The combination of the first heat exchanger 24 and the second heat exchanger 26 can generally be described as comprising one or more curtains or panels that are positioned within the enclosure 50 and are at least partially submerged within the heat storage medium 30.

Since both the first heat exchanger 24 and the second heat exchanger 26 are positioned upon the curtain or panel, such a combination shall be referred to as a heat exchanger curtain 90.

It is the general intention of the inventor that a plurality of interconnected heat exchanger curtains 90 be used within the enclosure 50 and apparatus 20. However, there may be a situation wherein only a single heat exchanger curtain 90 is needed.

Each heat exchanger curtain 90 may be so sized and configured that under predetermined conditions each such curtain 90 will have a predictable capacity to charge and/or discharge the surrounding heat storage medium 30. Consequently, a calculation can be made as to the number of heat exchanger curtains 90 that must be employed or operated to meet or exceed any particular air conditioning and/or refrigeration load or demand. If more cooling capacity is needed, then more heat exchanger curtains 90 may be used and/or employed.

Within one embodiment of the present invention, each heat exchanger curtain 90 functions as a separate cassette, magazine, or cartridge that can be added as needed to the apparatus 20. The engagement of additional heat exchanger curtains 90 may be accomplished by their physical attachment to the remaining apparatus 20, as would occur when an originally installed apparatus 20 is being altered or modified for greater cooling capacity.

Alternatively, a sufficient number of heat exchanger curtains 90 may be initially placed within the enclosure 50, and then a switching device or valve mechanism 92 may be used to engage or disengage the proper number of curtains 90 for the required task. In essence, each individual heat exchanger curtain 90 could function separately from the remaining heat exchanger curtains 90. Valve mechanism 92 is shown in FIG. 1.

Within a further embodiment of the invention, all heat exchanger curtains 90 that are positioned within the enclosure 50 may be operatively connected to one another. Thus, when the apparatus 20 is operated, all heat exchanger curtains 90 are operated simultaneously, albeit, possibly at a lower rate of efficiency than of what they are capable.

When more than one heat exchanger curtains 90 are used, each individual curtain 90 is secured to or suspended from a support rack 94, brace, framework, or rig. It is the intention of the inventor that the heat exchanger curtains 90 be secured to the support rack 94 so that each curtain 90 has a spaced orientation with or relationship to adjacent curtains 90, and that a space 96 or crevice be located between adjacent curtains 90.

The support rack 94 may comprise a plurality of beams, joists, or girders that generally span across the width or length of the enclosure 50. For example, within the preferred embodiment of the invention, the beams of the support rack 94 comprise a plurality of pipes 98 to which each heat exchanger curtain 90 is attached, and from which each heat exchanger curtain 90 is suspended.

As can be easily seen within the Figures, and particularly within FIG. 1, the beams or pipes 98 have a generally orthogonal orientation with respect to the generally planar heat exchanger curtains 90.

Figure 2:
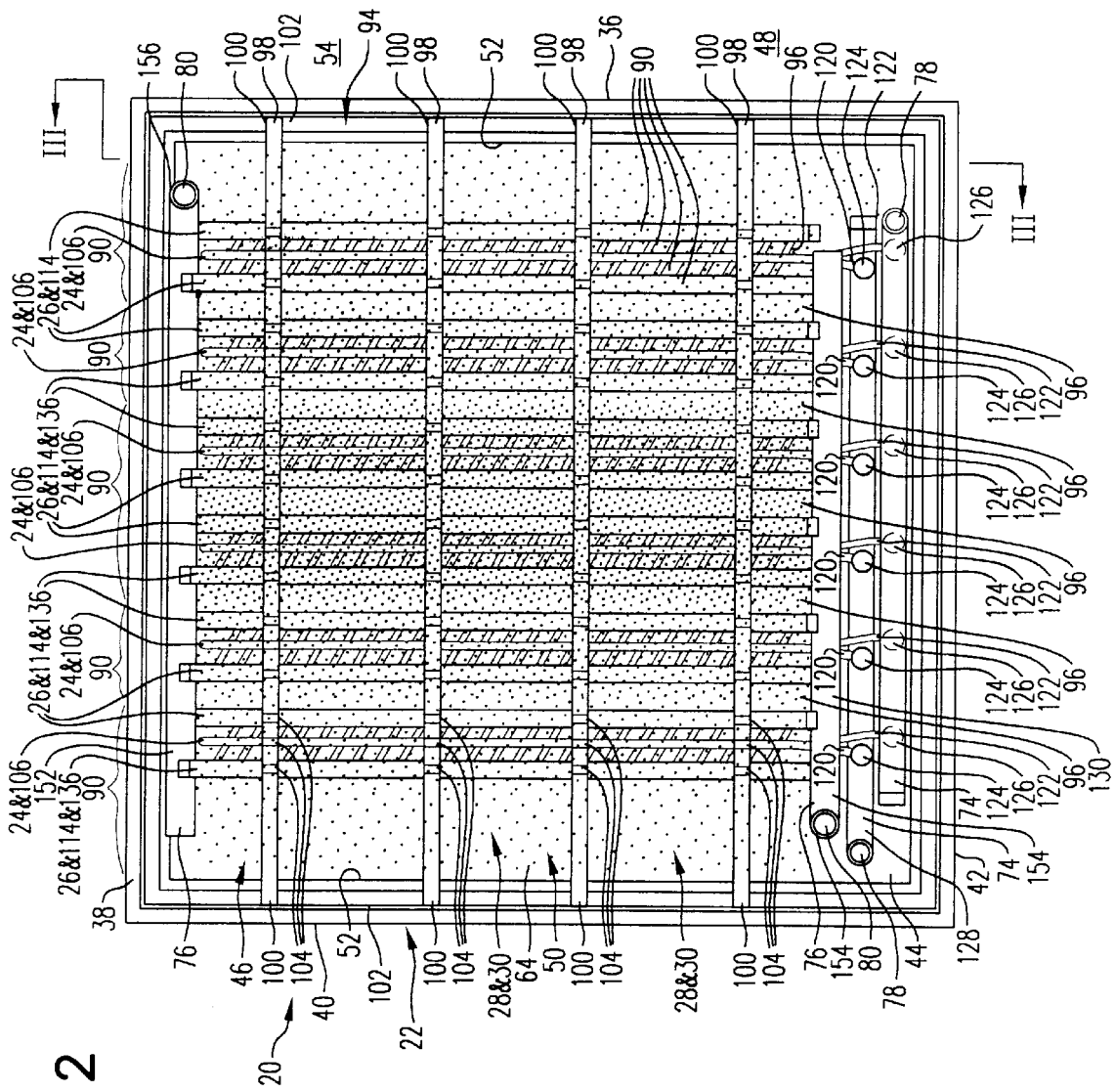
FIG. 2 is a plan view of the first embodiment of the invention as illustrated in FIG. 1, except with the cover being removed.

As best seen in FIG. 2, the terminal ends 100 of the beams or pipes 98 are supported within a collar 102 of metal, L-shaped angle-iron, that is positioned about the upper rim 68, edge, ridge, or periphery of the housing 22 sidewalls 36, 38, 40, and 42.

Any appropriate means 104 to attach or secure the heat exchanger curtains 90 to the beams or pipes 98 may be used. For example, lengths of rubber or plastic, rope, cord, cable, chains, wire, ties, belts, bands, straps, buckles, hooks, pins, screws, bolts, nails, or any other means for attaching such elements together may be used.

It is generally intended that the heat exchanger curtains 90 be literally suspended within the heat storage medium 30. In other words, the heat exchanger curtains 90 should be spaced above and not contact the floor of the enclosure 50.

Both the first heat exchanger 24 and the second heat exchanger 26 operate upon the principle of thermal equilibrium. In essence, the law of thermal equilibrium states that when two bodies having different temperatures are exposed to one another, the temperature of both bodies will change until a uniform temperature is attained between both bodies. In other words, the warmer body will become cooler and the cooler body will become warmer until an equilibrium or balance in temperature is reached.

In very general terms, the first heat exchanger 24 defines or is connected to a refrigeration system. The refrigeration system is used to remove heat from the heat storage medium 30, thereby freezing the medium 30. Once the heat storage medium 30 is frozen, the coolness stored therein can be used when a demand arises. Any appropriate means to reduce the temperature of the heat storage medium 30 may be utilized.

In very general terms, the second heat exchanger 26 also defines or is connected to a refrigeration system, albeit a different refrigeration system. However, this second refrigeration system is used to remove heat from a particular application such as from the air located within a building, cold storage area, or the like.

The means to accomplish this task is the thermal exposure of the second heat exchanger 26 to the frozen heat storage medium 30. In other words, thermal exposure of the fluid or gas 80, contained within the second heat exchanger 26, to the lower temperatures of the frozen heat storage medium 30 reduces the temperature of the fluid or gas 80.

Conversely, thermal exposure of the cooled heat storage medium 30 to the heated fluid or gas 80 causes the heat storage medium 30 to absorb heat therefrom, which further melts the medium 30 to a liquid state.

However, the cooled fluid or gas 80 may be transported to a remote site to absorb heat from a desired application.

Once the heat storage medium 30 reaches a predetermine state of discharge, the first heat exchanger 24 may be activated to recharge and reduce the temperature of the heat storage medium 30.

The particular design of the first heat exchanger 24 and the second heat exchanger 26, and their interrelationship with one another will now be discussed.

A primary element of the first heat exchanger 24 is a length of hollow tubing that forms and defines a generally continuous first conduit 106. The first conduit 106 should be capable of being at least partially positioned within the enclosure 50. More particularly, the first conduit 106 is capable of being at least partially submerged within the heat storage medium 30 contained within the enclosure 50.

The first heat exchanger 24 functions as means for decreasing the temperature of the heat storage medium 30. To accomplish this task, the refrigerant 78 or other chilled fluid is placed within and passed through the first conduit 106 of the first heat exchanger 24. Within this document, the term refrigerant is used to define both what would be considered a traditional refrigerant, such as ammonia or other chemical, and a chilled or cooled fluid, such as but not limited chilled water, brine or glycol solution.

Any appropriate means for decreasing the temperature of the refrigerant 78 below the temperature of the surrounding fluid may be used. For example, within the preferred embodiment of the invention a chiller is used.

Furthermore, any appropriate means may be used to transport the refrigerant 78 through the first conduit 106. Within the preferred embodiment of the invention, a pump is used for this purpose.

In essence, the first conduit 106 can define and function as an evaporator through which the refrigerant 78 is passed. Alternatively, the refrigerant 78 may simply comprise a chilled brine, refrigerant, glycol solution, or other fluid material that is chilled at a remote location and is transported into enclosure 50.

Of course, in an alternative embodiment of the invention, a separate evaporator is provided and the cooled refrigerant is simply transported through the first heat exchanger 24 and first conduit 106.

As explained above, the first heat exchanger 24 may include any appropriate means for decreasing the temperature of the refrigerant 78 below the temperature of the heat storage medium 30 that surrounds the first conduit 106. Consequently, when activated, the first heat exchanger 24 is capable of selectively reducing the temperature of the heat storage medium 30 within the enclosure 50.

Within the preferred embodiment of the invention, the first conduit 106 is manufactured from a substance that can easily cool and freeze adjacent and surrounding heat storage medium 30, and yet withstand the nearly constant temperature and volume changes that occur within the frozen heat storage medium 30. For example, the first conduit 106 may be manufactured from rubber, plastic, ethylene-propylene-terpolymer (which is commercially known as EPDM), from radiant heat tubing, and/or from any other appropriate material. The inventor prefers to use flexible radiant heat tubing for the first conduit 106.

Figure 4:
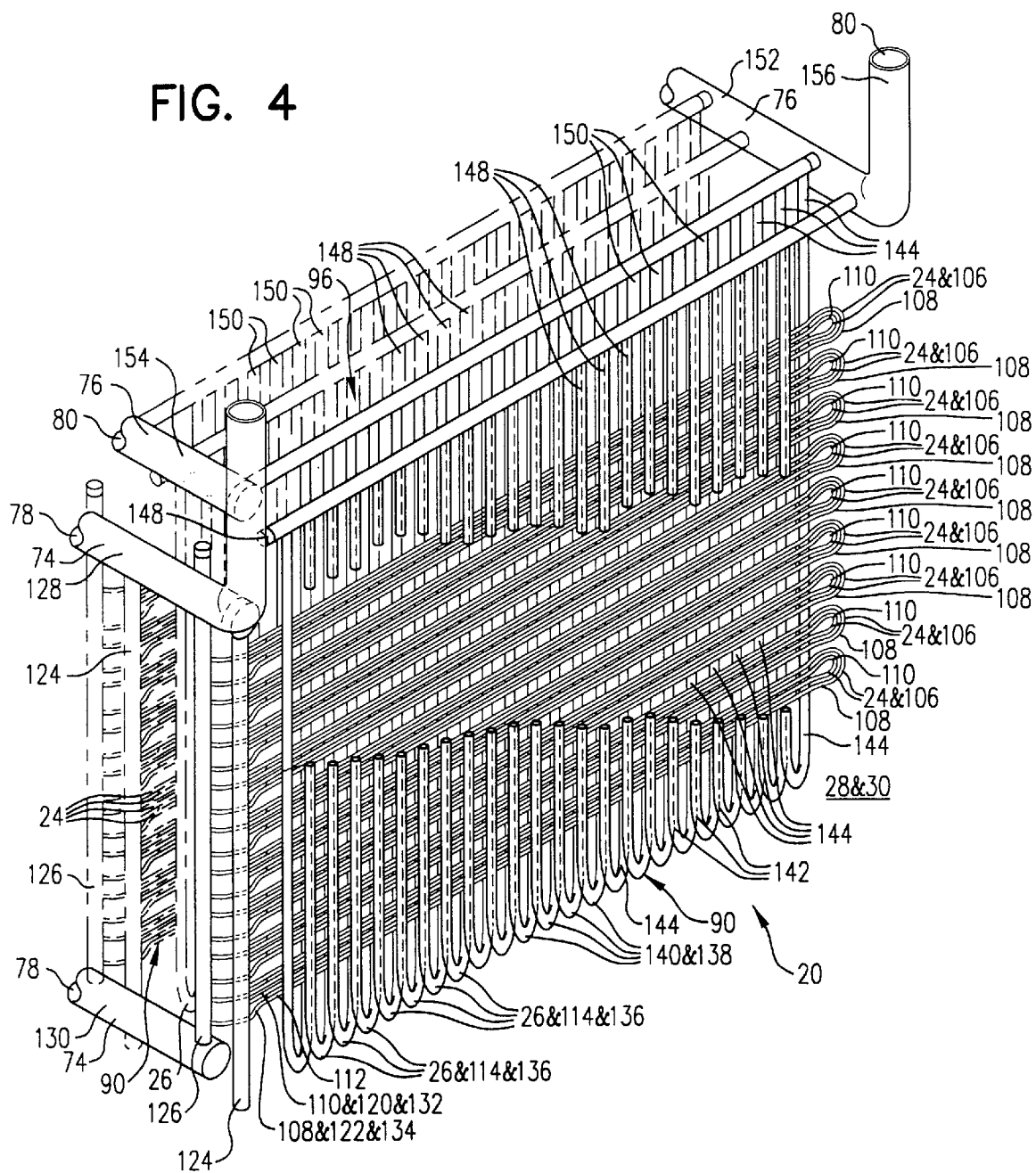
FIG. 4 is an enlarged, partial, isometric view of a representative piping matrix having a portion of a first heat exchanger interwoven with a portion of a second heat exchanger as seen from a plane generally defined by line III—III in FIG. 2.
Figure 5:
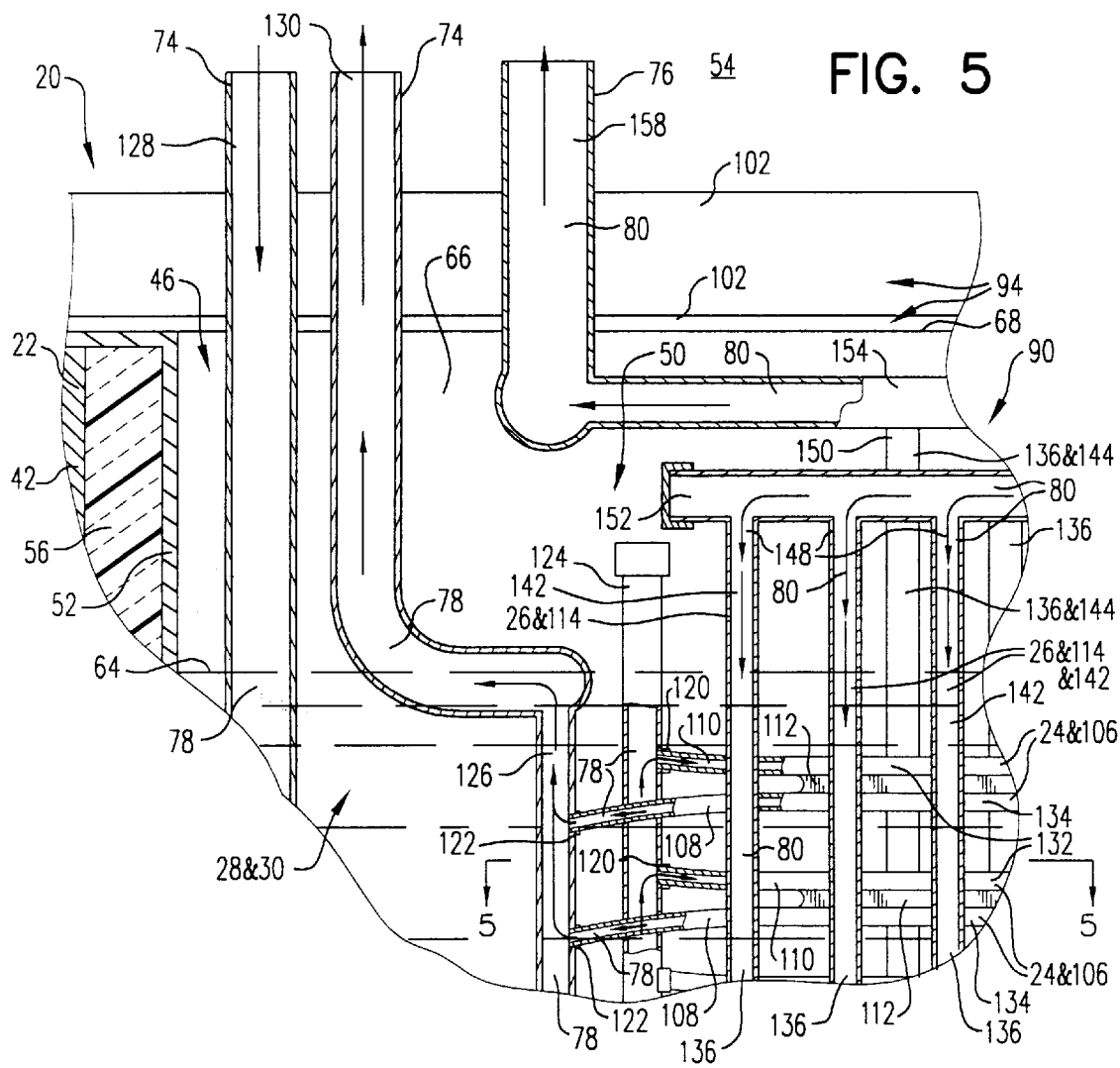
FIG. 5 is an enlarged, partial, cross-sectional, side-elevational view of an inlet port and an outlet port for the first heat exchanger and an inlet port for the second heat exchanger as found within the first embodiment of the invention.

As best seen in FIGS. 4 and 5, the preferred flexible radiant heat tubing is manufactured to have two parallel tubes 108 and 110 that are spaced apart by a webbing 112 that spans therebetween.

It is also preferred that the first conduit 106 be manufactured from a generally flexible material having a coefficient of thermal conductivity of about 0.02 to 10.0 $BTU\text{-}FT/FT^2\text{-}H\text{-}°F$. Within the preferred embodiment of the invention, the first conduit 106 is manufactured from a material being sold under the trademark RADIANT ROLL that has a coefficient of thermal conductivity of about 0.081 $BTU\text{-}FT/FT^2\text{-}H\text{-}°F$.

The particular placement of the first conduit 106 within the heat exchanger curtain 90 will be discussed following a description of the second heat exchanger 26.

A primary element of the second heat exchanger 26 is a length of hollow tubing that forms and defines a generally continuous second conduit 114. The second conduit 114 should also be capable of being at least partially positioned within the enclosure 50. More particularly, the second conduit 114 is capable of being at least partially submerged within the heat storage medium 30 contained within the enclosure 50.

The second heat exchanger 26 functions as means for increasing the temperature of the heat storage medium 30, or in other words, for drawing coolness from the frozen or nearly frozen heat storage medium 30 for use within the building or another application.

To accomplish this task, a fluid or gas 80 is placed within and passed through the second conduit 114. In essence, the second conduit 114 defines and functions as a radiator through which heated fluid or gas 80 may be passed.

If desired, the second heat exchanger 26 may include any appropriate means to increase the temperature of the fluid or gas 80 contained within the second conduit 114 to a temperature that is above the temperature of the heat storage medium 30 surrounding the second conduit 114.

In practice, however, the fluid or gas 80 contained within the second conduit 114 becomes heated as a natural consequence of being circulated through an auxiliary or ancillary air conditioner system or other application, whereupon the fluid or gas 80 absorbs heat at a remote location.

Consequently, when activated, the second heat exchanger 26 is capable of selectively removing coolness from the heat storage medium 30 contained within the enclosure 50, and reduce the temperature of the fluid or gas 80 that is contained within the second conduit 114.

Any appropriate means may be used to transport the fluid or gas 80 through the second conduit 114. Within the preferred embodiment of the invention, a pump is used for this purpose.

It is preferred that the second conduit 114 be manufactured from a substance that can easily transfer and expend heat from the fluid or gas 80 contained therein to the adjacent and surrounding heat storage medium 30. For example, the second conduit 114 may be manufactured from metal, such as from brass, copper, and/or from any other appropriate material. The inventor prefers to use copper tubing for the second conduit 114.

It is also preferred that the second conduit 114 be manufactured from a material having a coefficient of thermal conductivity of about 100 to 1000 BTU-FT/FT$^2$-H-°F. Within the preferred embodiment of the invention, the second conduit 114 is manufactured from copper tubing having a coefficient of thermal conductivity of about 232.0 BTU-FT/FT$^2$-H-°F.

Since heated fluid and/or gas 80 may be continually passed through the second conduit 114, the heat storage medium 30 immediately contacting and surrounding the second conduit 114 would not become frozen. It should be remembered that cold refrigerant 78 is not passed through the second conduit 114. Consequently, the second conduit 114 is not exposed to significant volume changes that can occur within the frozen heat storage medium 30.

Instead, as the thickness of the frozen heat storage medium 30 surrounding the first conduit 106 grows and enlarges, the liquid heat storage medium 30 surrounding the second conduit 114 is simply pushed along a de facto liquid conduit 32' that surrounds the length of the second conduit 114 and, therefore, does not exert any significant pressure or force upon the second conduit 114.

In other words, if the block of ice is only partially melted and the cooling process begins again, new frozen ice is formed about the first conduit 106. Such newly frozen ice, however, expands and displaces much of the liquid water. In other words, the freezing water has a place to push unfrozen water back up to the surface. The liquid conduits 32' surrounding the second conduit 114 allow the liquid water to be displaced therethrough, thereby relieving the entire system of undue pressures imparted by freezing, thawing, and refreezing ice.

Within the preferred embodiment of the invention, the second heat exchanger 26 is manufactured from metal tubing. Such metal tubing has an extremely high value of thermal conductivity. Consequently, the metal tubing can quickly transmit heat to the ice and liquid contained in the liquid conduit 32'. Convection currents that are generated within the liquid conduit 32' that surround the metal tubing actually scrub the ice to melt it more rapidly. As a result, the entire ice storage system of the present invention can be rapidly discharged. In contrast, other systems require a substantial period of time to discharge the system or melt the ice, and may require mechanical agitation.

Due to the high thermal conductivity of the metal tubing within the second heat exchanger 26, the block of ice can be more rapidly discharged or melted than was previously available in the industry. Such rapid discharge has an addition benefit in maintaining a lower or cooler temperature within the second heat exchanger 26 throughout the discharge procedure, for a longer period of time.

In the preferred embodiment of the invention, the second conduit 114 has a generally vertical orientation. Consequently, the liquid heat storage medium 30 may be pushed upwardly along a channel immediately exterior of the second conduit 114.

Alternatively, if desired, the apparatus 20 of the invention may be configured so that the second conduit 114 has a generally horizontal orientation, whereupon the liquid heat storage medium 30 will be pushed along a channel immediately exterior of the second conduit 114 to the ends of the second conduit 114.

Even if the growth of ice or frozen heat storage medium 30 eventually contacts the second conduit 114, such ice or frozen heat storage medium 30 could be immediately melted by the thermal release of heat contained within the second conduit 114. Consequently, it would be nearly impossible for an operator to damage the apparatus 20 since heated fluid and/or gas 80 are being passed through the second conduit 114.

Even if no heated fluid and/or gas 80 is passed through the second conduit 114 and the system is completely frozen solid, the apparatus 20 is not exposed to a danger of breakage, because the apparatus 20 is specifically designed to eliminate captured pockets of liquid heat storage medium 30. Instead the liquid heat storage medium 30 is expelled either upwardly or outwardly during the freezing process.

In addition, and this is an extremely important and significant feature of the present invention, both the first heat exchanger 24 and the second heat exchanger 26 can be operated simultaneously. Thus, there is no need nor requirement that the thermal reservoir 28 be completely discharged prior to recharging the thermal reservoir 28.

Figure 3:
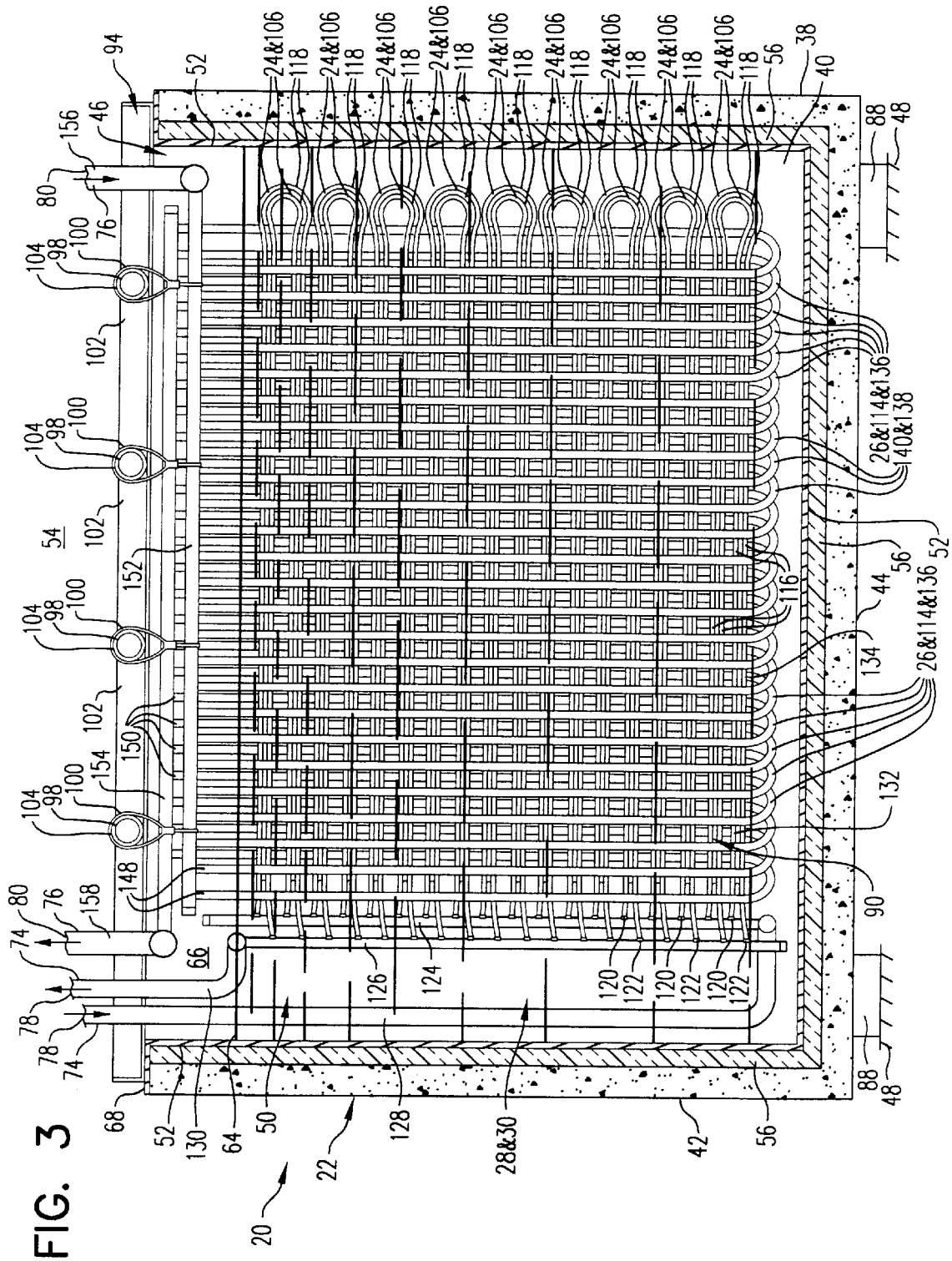
FIG. 3 is a cross-sectional, side-elevational view of the first embodiment of the invention as viewed from a plane generally defined by line III—III in FIG. 2.

As illustrated within the Figures, the first conduit 106 preferably has a generally serpentine configuration with a plurality of spaced, generally parallel legs 116. As best seen in FIG. 3, one or more ends 118 of the legs 116 of the first conduit 106 can be bent to form a generally U-shaped, V-shaped, Z-shaped, N-shaped, M-shaped, or W-shaped conduit. Since the first conduit 106 is generally manufactured from a flexible material, the bends at the ends 118 of the legs 116 can be created by simply folding over the tubing material. Care should be taken, however, to avoid kinking the flexible tubing.

To obtain the full benefit and effect of the refrigerant passing through the first conduit 106, the inventor prefers to arrange the various legs 116 of the first conduit 106 so that the average temperature between adjacent legs 116 are approximately equal. To accomplish this, the first conduit 106 can utilize multiple pairs of bent legs 116.

Each pair of bent legs 116 has a first terminal end 120 and an adjacent second terminal end 122. Each first terminal end 120 of each pair of bent legs 116 comprised within the first conduit 106 is operably connected to an input pipe 124. Each second terminal end 122 of each pair of bent legs 116 comprised within the first conduit 106 is operably connected to an output pipe 126. The input pipe 124 and the output pipe 126 are preferably positioned adjacent or near to one another.

If more than one heat exchanger curtain 90 is used, then the first conduit 106 found within each exchanger curtain 90 is provided with its own input pipe 124 and output pipe 126.

Each of the many input pipes 124 is then operably connected to a main input pipe 128 that enters into the enclosure 50.

Similarly each of the many output pipes 126 is operably connected to a main output pipe 130 that exits out of the enclosure 50.

Thus, a closed system is created, wherein refrigerant 78 is passed through the main input pipe 128 and is distributed through each of the various individual input pipes 124 associated with each heat exchanger curtain 90. The refrigerant 78 then passes from the individual input pipes 124 into a first leg 132 of the first conduit 106, around the bent end 118, and down a second leg 134 of the first conduit 106, whereupon the refrigerant 78 enters the individual output pipe 126 associated with its respective heat exchanger curtain 90. The refrigerant 78 is then collected from the various individual output pipes 126 of each heat exchanger curtain 90 and is passed into the main output pipe 130 to exit from the enclosure 50.

It is the general intention of the inventor that the flow of refrigerant 78 within any given leg 116, and more particularly within any first leg 132 and/or second leg 134 of the plurality of legs 116 found within the first conduit 106 of any given heat exchanger curtain 90, will have an opposite flow direction than the flow direction of the refrigerant 78 found within any immediately adjacent leg 116. This is the preferred embodiment of the invention. Of course other configurations or flow patterns could be used. However, the inventor believes that use of such alternative configurations or flow patterns would render the invention less efficient.

By applying a pressure to the refrigerant 78, the refrigerant 78 can be forced to pass through each and every leg 116 of each first conduit 106 within the enclosure 50. In addition, such passage of the refrigerant 78 through each first conduit 106 will have a uniform and predictable effect on the surrounding heat storage medium 30.

In a similar manner, the second conduit 114 preferably has a generally serpentine configuration with a plurality of spaced, generally parallel legs 136. One or more ends 138 of the legs 136 of the second conduit 114 can be bent to form a generally U-shaped, V-shaped, Z-shaped, N-shaped, M-shaped, or W-shaped conduit.

As best seen within FIG. 4, since the second conduit 114 is generally manufactured from a relatively stiff material or metal such as copper, the legs 136 may be formed from straight lengths of tubing. Commercially available one-hundred-eighty degree (180 degree) U-bend fixtures or U-bend joints 140 can then be soldered onto the desired end or ends 138 of adjacent first leg 142 and second leg 144 to form the generally serpentine configuration.

Alternatively a plurality of elbow joints or fixtures (not shown) can be used to achieve a one-hundred-eighty degree (180 degree) reversal in direction at bent end 138.

To obtain the full benefit and effect of the fluid or gas 80 passing through the second conduit 114, the inventor prefers to arrange the various legs 136, and more particularly the first leg 142 and second leg 144 of the second conduit 114, so that the average temperature between adjacent legs 136 are approximately equal.

To accomplish this, the second conduit 114 also utilizes multiple pairs of bent legs 136. Each pair of bent legs 136 has a first end 148 and an adjacent second end 150. Each first end 148 of each pair of bent legs 136, comprised within the second conduit 114, is operably connected to a supply pipe 152. Each second end 150 of each pair of bent legs 136, comprised within the second conduit 114, is operably connected to a return pipe 154. The supply pipe 152 and the return pipe 154 are preferably positioned adjacent or near to one another.

If more than one heat exchanger curtain 90 is used, then the second conduit 114 found within each exchanger curtain 90 is provided with its own supply pipe 152 and return pipe 154.

Each of the many individual supply pipes 152 is then operably connected to a main supply pipe 156 that enters into the enclosure 50.

Similarly, each of the many individual return pipes 154 is operably connected to a main return pipe 158 that exits out of the enclosure 50.

Thus, a closed system is created, wherein fluid and/or gas 80 is passed through the main supply pipe 156 and is distributed through each of the various individual supply pipes 152 associated with each heat exchanger curtain 90. The fluid and/or gas 80 then passes from the individual supply pipes 152 into the first leg 142 of the second conduit 114, around the bent end 138, and down the second leg 144 of the second conduit 114, whereupon the fluid and/or gas 80 enters the individual return pipe 154 associated with its respective heat exchanger curtain 90. The fluid and/or gas 80 is then collected from the various individual return pipes 154 of each heat exchanger curtain 90 and is passed into the main return pipe 158 to exit from the enclosure 50.

Again, it is the general intention of the inventor that the flow of fluid and/or gas 80 within any given leg 136, and more particularly within any first leg 142 and/or second leg 144 of the plurality of legs 136 found within a second conduit 116 of a single heat exchanger curtain 90, will have an opposite flow direction than the flow direction of the fluid and/or gas found within any immediately adjacent leg 136. Again, this is the preferred embodiment of the invention. Other configurations or flow patterns could be used. However, the inventor believes that use of such alternative configurations or flow patterns would render the invention less efficient.

By applying a pressure to the fluid and/or gas 80, the fluid and/or gas 80 can be force to pass through each and every leg 136 of each second conduit 114 within the enclosure 50. In addition, such passage of the fluid and/or gas 80 through each second conduit 114 will have a uniform and predictable effect on the surrounding heat storage medium 30.

As can be seen in the various Figures, a wide variety of differently configured heat exchanger curtains 90 can be created. The primary difference between the various illustrated embodiments of the invention is the manner within which the legs 116 of the first conduit 106 are oriented with respect to the legs 136 of the second conduit 114.

For example, as shown in FIGS. 1 through 7, and best seen in FIG. 4, each leg 116 of the first conduit 106 may be juxtaposed, and interwoven or intermeshed between the respective first leg 142 and second leg 144 of each bent section of the second conduit 114. In other words, the first conduit 106 at least partially interweaves or intermeshes with the second conduit 114.

Since the first heat exchanger 24 is actually woven into and/or around the second heat exchanger 26, each heat exchanger 24 and 26 imparts structural integrity to the other heat exchanger.

Figure 8:
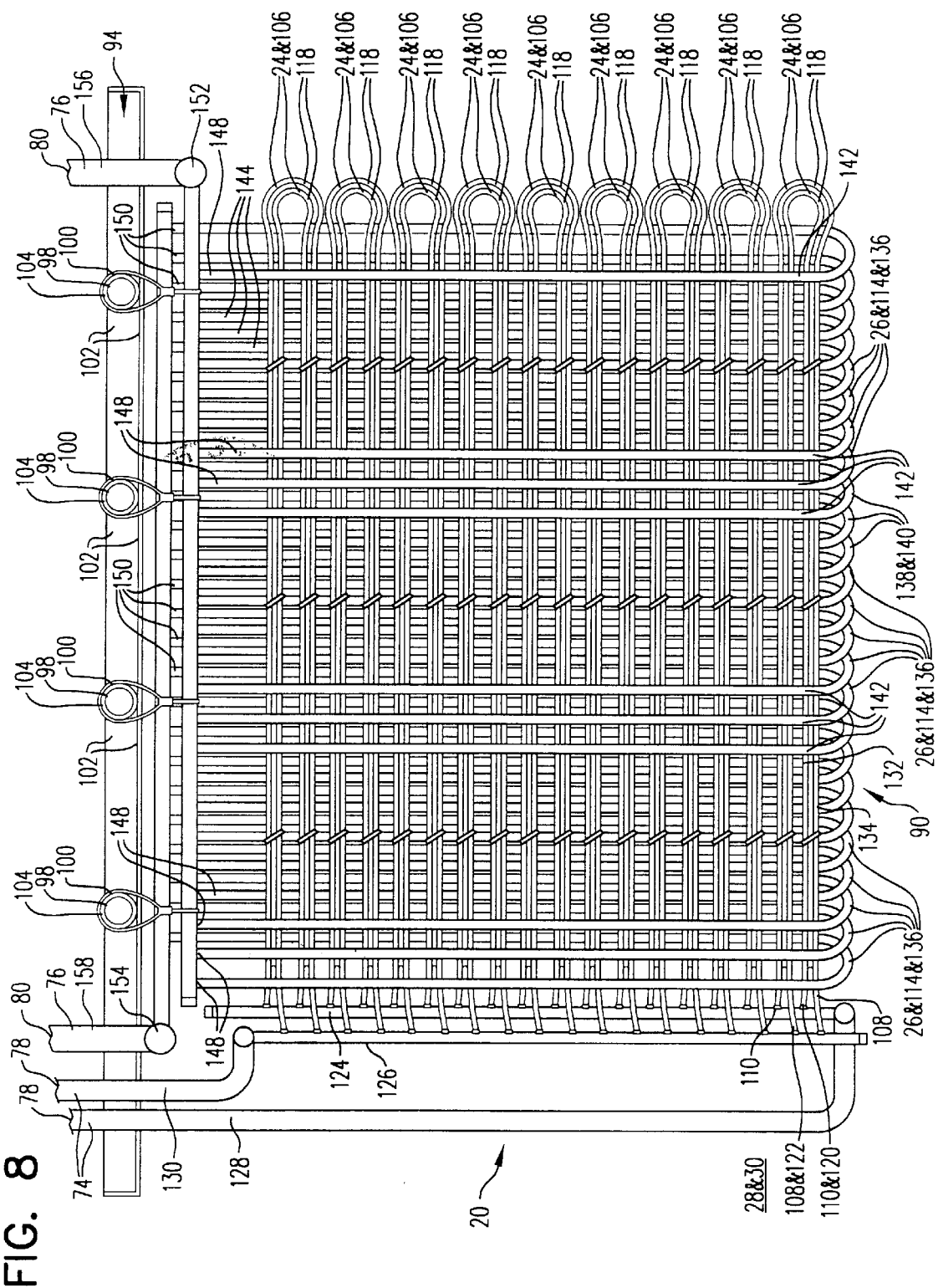
FIG. 8 is a partial, side-elevational view of a representative piping matrix having a portion of the first heat exchanger interwoven with a portion of the second heat exchanger as seen from a plane generally defined by line III—III in FIG. 2.

Alternatively, as shown in FIG. 8, each leg 116 of the first conduit 106 may be juxtaposed, and interwoven or intermeshed between only a select few of the first legs 142 and second legs 144 of various bent sections of the second conduit 114.

Figure 9:
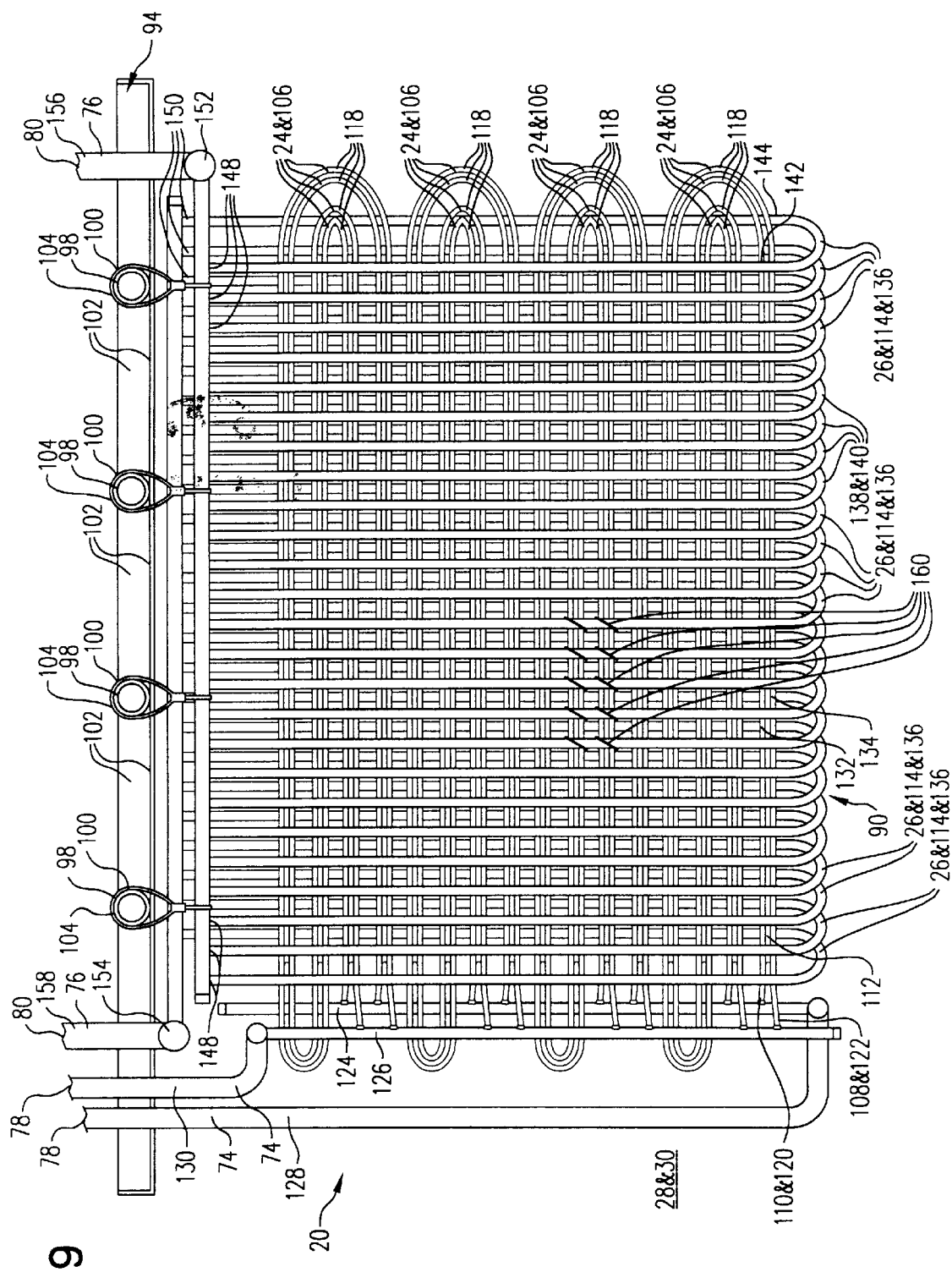
FIG. 9 is a partial, side-elevational view of an alternative embodiment of a representative piping matrix having a portion of the first heat exchanger interwoven with a portion of the second heat exchanger as would otherwise be seen from a plane generally defined by line III—III in FIG. 2. However.

In an even further embodiment of the invention, as shown in FIG. 9, the length of the first conduit 106 may be extended such that it is capable of folding back to form an addition set of legs 116. As a result, first conduit 106 generally has three (3) bent ends 118 and four (4) separate legs 116 to each bent section of the first conduit 106.

FIG. 10 illustrates an alternative embodiment for the second conduit 114, wherein the length of a single second conduit 114 is so extended that it may be bent to have five (5) separate bent ends 138 and six (6) separate legs 136 to each bent section of the second conduit 114.

FIG. 11 illustrates an alternative embodiment of the invention, wherein the second conduits 114 assume a generally horizontal orientation and are bent to participate in and be interconnected between at least two successively adjacent heat exchanger curtains 90.

FIG. 12 illustrates a further alternative embodiment of the invention wherein the first conduits 106 assume a generally horizontal orientation and are bent to participate in and be interconnected between at least two successively adjacent heat exchanger curtains 90.

It should also be noted that any appropriate means 160 may be employed to properly position and secure the first conduit 106 to the second conduit 114 within each heat exchanger curtain 90. For example, lengths of rubber or plastic, rope, cord, cable, chains, wire, ties, belts, bands, straps, buckles, hooks, pins, screws, bolts, nails, or any other means for attaching such elements together may be used.

Figure 13:
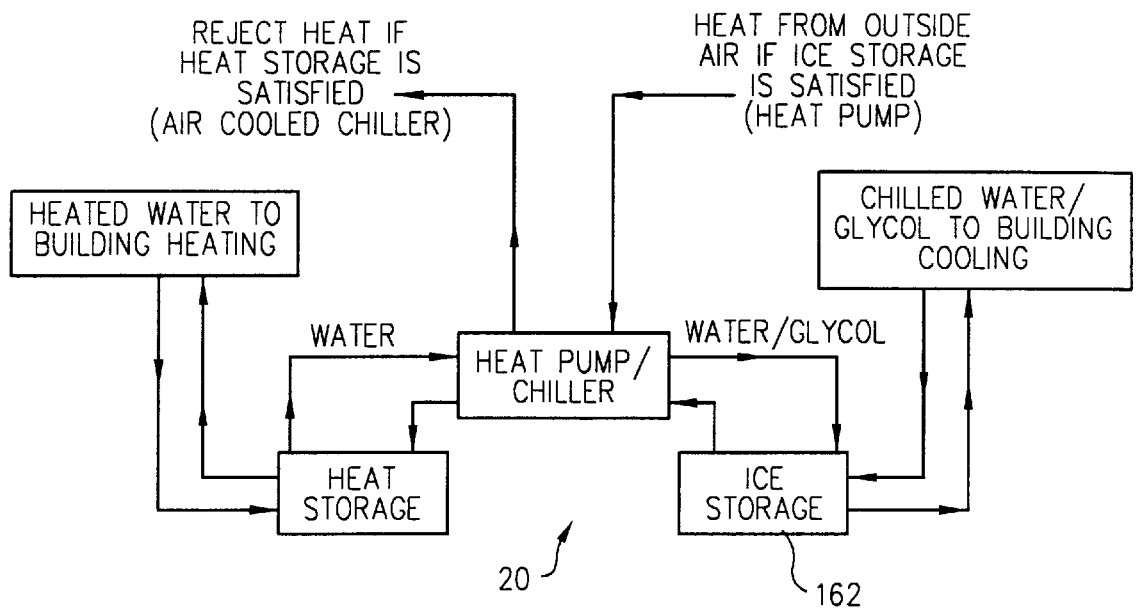
FIG. 13 is a schematic flow chart illustrating the interrelationship between various components of the invention.

FIG. 13 is a schematic flow chart illustrating the interrelationship between various components of the invention. The foregoing explanation was primarily focused upon the apparatus 20 and processes used within the ice storage component 162 shown in the schematic flow chart. The inventor believes that the steps, processes, and flow patterns disclosed within FIG. 13 should be self explanatory to a person skilled in the relevant art, once such person is provided with a copy of this document.

It should also be noted that it is often difficult and expensive to use the previously known refrigeration systems, that utilize frozen blocks of ice, within multiple storied buildings. The reason for such difficulty and expense is that external circulation systems must be used. Furthermore, such external circulation systems must have a high pressure capacity to permit their use within multiple storied buildings. Consequently, such external circulation systems require the purchase, installation, and operation of expensive and cumbersome external heat exchangers, circulating pumps, and additional controls and valves in order to circulate the refrigerant or fluid within the external system.

In contrast, the present invention does not necessarily require the use of an external circulation system. Although an external circulation system could be used, if desired, it is not required. Consequently, most if not all of such additional elements and equipment are not needed within the present invention.

Furthermore, within the previously known systems, plastic pipes are used to both charge or freeze the ice and to discharge or melt the ice. The maximum operating pressure for such plastic piped systems is only ninety pounds per square inch (90 psi). Such a low pressure capacity necessitates the use of an external circulation system.

In contrast the second heat exchanger 26 of the present invention is preferably manufactured from copper. Copper has an internal working pressure capacity of about 300 pounds per square inch gage (300 psig) or higher. Consequently, the present invention is able to maintain a high pressure rate within the internal flow of the second heat exchanger 26. This enables feature enables the present invention to be used within multiple storied buildings and other applications wherein high working pressures are required. Furthermore, the present invention does not require the use of an external circulation system.

The means and construction disclosed herein are by way of example and comprise primarily the preferred and alternative forms of putting the invention into effect. Although the drawings depict the preferred and alternative embodiments of the invention, other embodiments are described within the preceding text. One skilled in the art will appreciate that the disclosed apparatus may have a wide variety of sizes, shapes, and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all modifications, equivalents, and alternative embodiments which fall within the legitimate and valid scope of the appended claims, appropriately interpreted under the Doctrine of Equivalents.

INDUSTRIAL APPLICABILITY

The present invention may be used to selectively cool and/or heat residential and commercial buildings. More particularly, the present invention may be used with thermal storage and exchange systems wherein a heat storage medium, that is capable of reversibly passing between a liquid phase and a solid phase, functions as a thermal reservoir. It is important to note that this invention permits the near immediate transition between charging and discharging the system, without requiring a complete discharge of the thermal reservoir between phase changes. Consequently, the thermal reservoir may be partially discharged and then recharged without having to completely discharge the system before recharging can occur. Similarly, the thermal reservoir may be partially recharged and subsequently or simultaneously discharged. The thermal reservoir does not have to be completely recharged prior to discharging of the system.

If needed and/or desired, the present invention may also be used on a smaller scale than is required to cool and/or heat a building.

I claim:

1. An apparatus for causing a heat storage medium to pass between a liquid phase and a solid phase selectively and reversibly to charge or discharge a thermal reservoir, the heat storage medium defining the thermal reservoir, said apparatus capable of being supported by a support structure, said apparatus comprising a combination of:

(a) a housing defining an enclosure, said housing capable of being supported by the support structure, said housing capable of containing the heat storage medium within said enclosure;

(b) a first heat exchanger having a first conduit, said first conduit capable of being at least partially positioned within said enclosure, said first conduit capable of being at least partially submerged within the heat storage medium, said first heat exchanger having a refrigerant therein, said first heat exchanger having means for decreasing temperature of said refrigerant below temperature of the heat storage medium, said first heat exchanger capable of selectively reducing temperature of the heat storage medium within said enclosure; and (c) a second heat exchanger having a second conduit, said second conduit capable of being at least partially positioned within said enclosure, said second conduit capable of being at least partially submerged within the heat storage medium, said second heat exchanger having a fluid therein, said second conduit defining means whereby said fluid may pass, said second heat exchanger capable of selectively removing coolness from the heat storage medium, said first conduit having a generally serpentine configuration with a plurality of spaced, generally parallel legs, said second conduit having a generally serpentine configuration with a plurality of spaced, generally parallel legs, said first conduit at least partially interweaving between two or more of said legs of said second conduit.

2. The apparatus of claim 1, wherein said housing further comprises a liner positioned within said enclosure, said liner capable of at least partially enveloping the heat storage medium.

3. The apparatus of claim 1, wherein said housing comprises a concrete vessel, a thermally insulated metal vessel, a thermally insulated plastic vessel, or a composite vessel.

4. The apparatus of claim 1, wherein said housing further comprises a lid removably secured thereto.

5. The apparatus of claim 1, wherein said first conduit defines an evaporator through which said refrigerant may pass.

6. The apparatus of claim 1, wherein said second heat exchanger further comprises means for increasing temperature of said fluid above temperature of the heat storage medium.

7. The apparatus of claim 1, wherein said first conduit is manufactured from a generally flexible material having a coefficient of thermal conductivity of about 0.02 to 10.0 $BTU\text{-}FT/FT^2\text{-}H\text{-}°F$.

8. The apparatus of claim 1, wherein said second conduit is manufactured from a material having a coefficient of thermal conductivity of about 100 to 1000 $BTU\text{-}FT/FT^2\text{-}H\text{-}°F$.

9. The apparatus of claim 1, wherein said heat storage medium is water, brine solution, or glycol solution.

10. An apparatus for hydronically storing thermal heat for use within a building, said apparatus comprising a combination of:
(a) a first heat exchanger having a plurality of spaced, generally parallel conduits manufactured from a generally flexible material, said conduits of said first heat exchanger forming a first continuous conduit;
(b) a second heat exchanger having a plurality of spaced, generally parallel, coplanar conduits manufactured from a material having a coefficient of thermal conductivity of about 100 to 1000 $BTU\text{-}FT/FT^2\text{-}H\text{-}°F$., said conduits of said second heat exchanger forming a second continuous conduit, said conduits of said first heat exchanger interweaving between two or more of said conduits of said second heat exchanger;
(c) a container defining an enclosure into which said first heat exchanger and said second heat exchanger may be placed;
(d) a surrounding fluid placed within said container, said surrounding fluid at least partially surrounding and contacting said first heat exchanger and said second heat exchanger;
(e) a first fluid contained and transported within said first continuous conduit;
(f) a second fluid contained and transported within said second continuous conduit;
(g) means for increasing temperature of said first fluid above temperature of said surrounding fluid;
(h) means for transporting said first fluid through said first continuous conduit;
(i) means for decreasing temperature of said second fluid below temperature of said surrounding fluid; and
(j) means for transporting said second fluid through said second continuous conduit.

11. The apparatus of claim 10, wherein said second conduit of said second heat exchanger is manufactured from metal.

12. The apparatus of claim 11, wherein said second conduit of said second heat exchanger is manufactured from copper.

13. The apparatus of claim 10, wherein said first conduit of said first heat exchanger is manufactured from rubber, plastic, EPDM, or radiant heat tubing.

14. The apparatus of claim 10, wherein said surrounding fluid is water, brine solution, or glycol solution.

15. An apparatus for causing a heat storage medium to pass between a liquid phase and a solid phase selectively and reversibly to charge or discharge a thermal reservoir, the heat storage medium defining the thermal reservoir, said apparatus capable of being supported by a support structure, said apparatus comprising a combination of:
(a) a first heat exchanger having a plurality of spaced, generally parallel conduits manufactured from a generally flexible material, said first heat exchanger forming a first continuous conduit;
(b) a second heat exchanger having a plurality of spaced, generally parallel conduits manufactured from a material having a high coefficient of thermal conductivity, said second heat exchanger forming a second continuous conduit, said first continuous conduit at least partially interweaving with said second continuous conduit;
(c) a container into which said first heat exchanger and said second heat exchanger can be placed;
(d) a surrounding fluid placed within said container, said surrounding fluid at least partially surrounding and contacting said first heat exchanger and said second heat exchanger;
(e) a first fluid capable of being contained and transported within said first conduit;
(f) a second fluid capable of being contained and transported within said second conduit;
(g) means for decreasing temperature of said first fluid below temperature of said surrounding fluid;
(h) means for transporting said first fluid through said first conduit;
(i) means for increasing temperature of said second fluid above temperature of said surrounding fluid; and
(j) means for transporting said second fluid through said second conduit.

16. The apparatus of claim 1, wherein said generally parallel legs of said second conduit have a generally vertical orientation.

17. The apparatus of claim 16, wherein said generally parallel legs of said first conduit have a generally horizontal orientation.

18. The apparatus of claim 17, wherein a plurality of said first conduit and a plurality of said second conduit define at least one heat exchanger curtain within said housing.

19. The apparatus of claim 18, wherein said apparatus comprises a plurality of said heat exchanger curtains which enable selective partial charging or discharging of said heat storage medium.

* * * * *